United States Patent
Yamada (10) Patent No.: US 9,979,286 B2
(45) Date of Patent: May 22, 2018

(54) POWER CONVERTING DEVICE (71) Applicant: FUJI ELECTRIC CO.,LTD., Kawasaki-shi, Kanagawa (JP)

(72) Inventor: Ryuji Yamada, Hachioji (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 0 days. days.

(21) Appl. No.: 15/641,929

(22) Filed: Jul. 5, 2017

(65) Prior Publication Data

US 2017/0302169 A1    Oct. 19, 2017

Related U.S. Application Data

(63) Continuation of application No. PCT/JP2016/062196, filed on Apr. 18, 2016.

(30) Foreign Application Priority Data

Jun. 11, 2015   (JP) .................. 2015-117890

(51) Int. Cl.
*H02M 3/135*      (2006.01)
*H02M 3/155*      (2006.01)
(Continued)

(52) U.S. Cl.
CPC ............. *H02M 3/155* (2013.01); *H02M 1/08* (2013.01); *H02M 3/135* (2013.01); *H02M 7/12* (2013.01);
(Continued)

(58) Field of Classification Search
None
See application file for complete search history.

(56) References Cited

U.S. PATENT DOCUMENTS 6,043,705 A * 3/2000 Jiang .................. H02M 1/4208
327/589
8,467,212 B2  6/2013 Mino et al.
(Continued)

FOREIGN PATENT DOCUMENTS

JP    2012-65441    3/2012
JP    2012-70580    4/2012
(Continued)

OTHER PUBLICATIONS

International Search Report dated Jun. 21, 2016 in corresponding International Application No. PCT/JP2016/062196.

*Primary Examiner* — Jeffrey Gblende (57) ABSTRACT

A power converting device, in one possible configuration, includes a chopper circuit with a first semiconductor switching device, a fast recovery diode, and an inductor of which one end is connected to a connection point connecting between the first semiconductor switching device and fast recovery diode; a series circuit, connected in parallel with the fast recovery diode, including a rectifying diode with a greater reverse recovery loss and a smaller forward voltage drop than those of the fast recovery diode, and a second semiconductor switching device. The second semiconductor switching device has a lower breakdown voltage and a smaller forward voltage drop than those of the first semiconductor switching device, is configured to turn on when the first semiconductor switching device is turned off, and is configured to turn off at a timing before the first semiconductor switching device shifts from an off-state to an on-state.

18 Claims, 4 Drawing Sheets

(51) Int. Cl.
*H02M 7/12* (2006.01)
*H02M 1/08* (2006.01)
*H02M 7/162* (2006.01)
*H02M 1/00* (2006.01)

(52) U.S. Cl.
CPC .... *H02M 7/162* (2013.01); *H02M 2001/0054* (2013.01)

(56) References Cited

U.S. PATENT DOCUMENTS

| | | | |
|---|---|---|---|
| 9,729,055 B1 * | 8/2017 | Yao | H02M 3/158 |
| 2008/0316779 A1 * | 12/2008 | Jayaraman | H02M 1/4225 363/74 |
| 2013/0152624 A1 | 6/2013 | Arisawa et al. | |
| 2015/0137784 A1 * | 5/2015 | Sugawara | H02M 3/156 323/282 |
| 2015/0340951 A1 * | 11/2015 | Wu | H02M 3/158 323/271 |

FOREIGN PATENT DOCUMENTS

| | | |
|---|---|---|
| JP | 5521796 | 4/2014 |
| JP | 2015-226441 | 12/2015 |

* cited by examiner

POWER CONVERTING DEVICE

CROSS-REFERENCE TO RELATED APPLICATIONS

This application is a continuation application, filed under 35 U.S.C. § 111(a), of International Application PCT/JP2016/062196 filed on Apr. 18, 2016 and claims foreign priority to Japanese Patent Application No. 2015-117890, filed Jun. 11, 2015, the content of each of which is incorporated herein by reference in its entirety.

BACKGROUND

1. Field

The present disclosure relates to technology for reducing loss in a semiconductor device, thereby achieving increased efficiency of a power converting device.

2. Related Art

Figure 6:
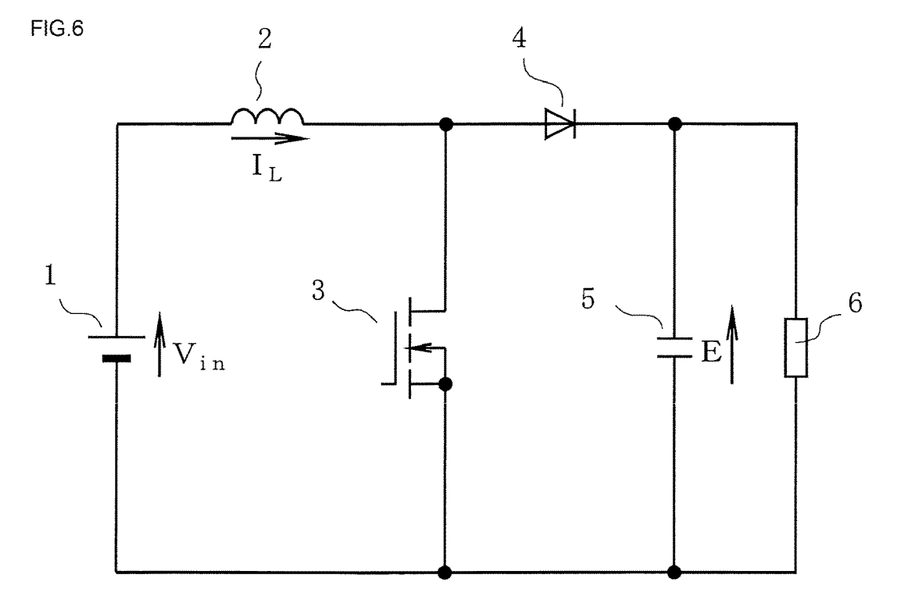
FIG. 6 is a circuit diagram showing a first related art technology.

FIG. 6 is a circuit diagram showing a first related art technology of a power converting device, which is well-known as a step-up chopper circuit. In FIG. 6, 1 is a direct current power supply, 2 is a inductor, 3 is a semiconductor switching device (hereafter referred to simply as a switching device) formed of a MOSFET, 4 is a diode, 5 is a capacitor, and 6 is a load.

Herein, an IGBT (insulated gate bipolar transistor) or BJT (bipolar transistor) is sometimes used in place of a MOSFET as the switching device 3.

An operation of the circuit shown in FIG. 6 is as follows.

When the switching device 3 is turned on, a voltage practically equivalent to a voltage $V_{in}$ of the direct current power supply 1 is applied to both ends of the inductor 2, and current flows along a path from the direct current power supply 1 through the inductor 2 and switching device 3 to the direct current power supply 1. At this time, a current $I_L$ of the inductor 2 increases gradually. Next, when the switching device 3 is turned off, current flows along a path from the direct current power supply 1 through the inductor 2, diode 4, and capacitor 5 to the direct current power supply 1, and a difference between the input voltage $V_{in}$ and a voltage E of the capacitor 5 is applied across the inductor 2.

According to a principle to be described hereafter, a state is such that $V_{in}$<E at a time of normal operation, because of which the current $I_L$ of the inductor 2 decreases. By controlling a time ratio of on and off-states of the switching device 3, the current $I_L$ can be controlled to an arbitrary value. Also, when an input power is greater than a power consumption of the load 6, a difference between the two powers is accumulated in the capacitor 5 and the voltage E rises, while when the input power is smaller than the power consumption, the difference in power is supplied to the load 6 by a discharging of the capacitor 5, because of which the voltage E decreases.

According to this method, the voltage E can be controlled to an arbitrary value higher than the input voltage $V_{in}$.

Meanwhile, even when an off-state is continued without the switching device 3 being operated, the current path from the direct current power supply 1 through the inductor 2, diode 4, and capacitor 5 to the direct current power supply 1 constantly exists, because of which it does not happen that the voltage E constantly drops below the input voltage $V_{in}$.

In the circuit of FIG. 6, a reverse voltage is applied to the diode 4 when the switching device 3 is turned on, because of which a reverse current—a so-called reverse recovery current—momentarily flows along a path from the capacitor 5 through the diode 4 and switching device 3 to the capacitor 5, after which the diode 4 is turned off. Loss due to this reverse recovery current, that is, reverse recovery loss, occurs every time the switching device 3 is turned on.

In order to reduce the size of the inductor 2, a switching frequency of the switching device 3 may be increased from several kilohertz to, in certain cases, several hundred kilohertz or more, because of which the reverse recovery loss when the switching device 3 is turned on is desirably extremely small. For this kind of reason, a fast recovery diode with a small reverse recovery loss is commonly used as the diode 4. In particular, a Schottky barrier diode using a WBG (wide bandgap) material such as SiC (silicon carbide) or GaN (gallium nitride) has an extremely small reverse recovery loss, and is therefore appropriate for this kind of application.

Figure 7:
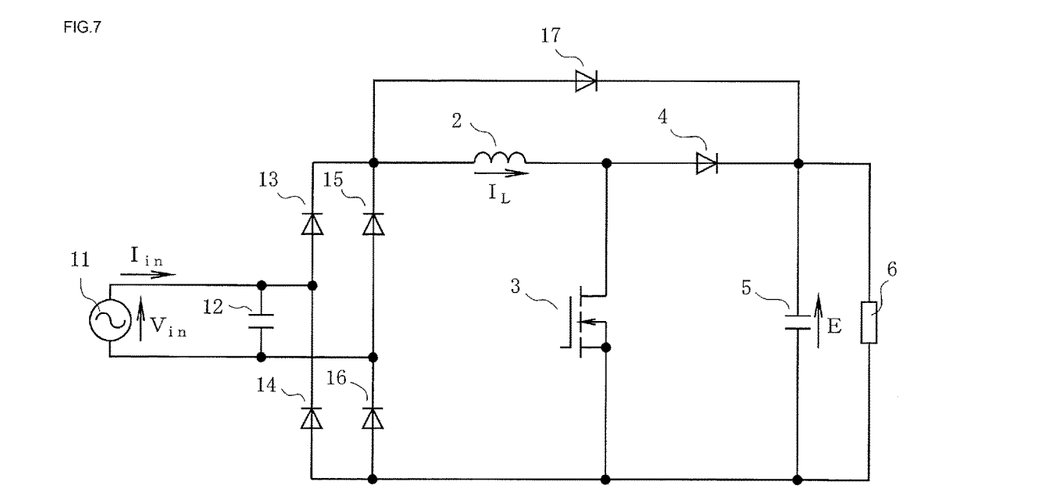
FIG. 7 is a circuit diagram showing a second related art technology.

Meanwhile, FIG. 7 is a circuit diagram showing a second related art technology, wherein a part having the same function as a part in FIG. 6 is allotted the same number.

In FIG. 7, 11 is an alternating current power supply, 12 is a capacitor, 13 to 16 are rectifying diodes configuring a bridge rectifier circuit, and 17 is a bypass diode.

Herein, as the alternating current power supply 11 is often connected to an alternating current power system, voltage sags and momentary interruptions caused by lightning striking the power system, or the like, that is, a voltage drop or power failure of an extent within several cycles of alternating current, sometimes occurs. Even when this kind of momentary voltage drop or power failure occurs and an input side power supply is interrupted, power consumption by the load 6 continues, because of which the voltage E of the capacitor 5 drops.

Further, when the input voltage $V_{in}$ returns to a steady-state value after the voltage E becomes lower than a peak value of the input voltage $V_{in}$ when a steady state exists, a period for which the current $I_L$ flows into the capacitor 5 without decreasing occurs even when the switching device 3 is turned off. When the current $I_L$ becomes excessive, the switching device 3 is turned off, because of which the current $I_L$ flows into the diode 4. Although a fast recovery diode is normally used as the diode 4, as previously mentioned, a characteristic of a fast recovery diode is such that resistance to a surge current is low in comparison with that of a rectifying diode. Consequently, even when a current is of an extent that the rectifying diodes 13 to 16 can resist, there is concern that the diode 4 will be damaged by the current.

In order to prevent the above-mentioned damage of the diode 4, the related art technology of FIG. 7 is such that current is caused to bypass the diode 4 by the bypass diode 17 being provided. By so doing, no voltage exceeding a forward voltage drop of the bypass diode 17 is applied across the inductor 2, an increase in the current $I_L$ is prevented, and the diode 4 is protected.

By the bypass diode 17 being connected in the position shown in FIG. 7, no high frequency pulse voltage is applied to the bypass diode 17 at a time of normal operation, because of which no reverse recovery occurs. Consequently, a rectifying diode with high surge current resistance can be used as the bypass diode 17, in the same way as for the rectifying diodes 13 to 16.

A circuit the same as that in FIG. 7 is described in, for example, patent application publication JP-A-2012-065441 (paragraphs [0013] to [0027], FIG. 1 and the like).

Figure 8:
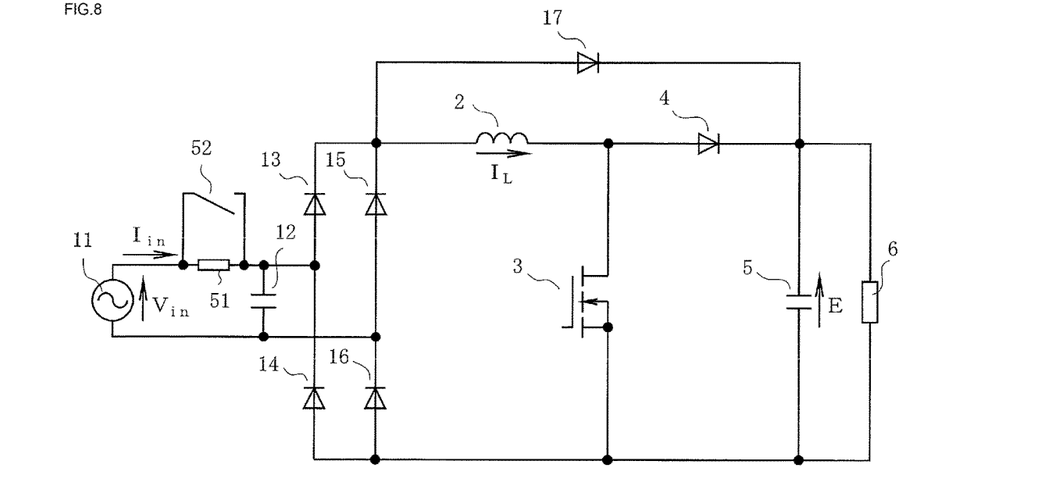
FIG. 8 is a circuit diagram showing a third related art technology.

Next, FIG. 8 is a circuit diagram showing a third related art technology. This related art technology is such that a current limiting resistor 51 is connected between one end of the alternating current power supply 11 and one end of the capacitor 12 of FIG. 7, and a switch (short circuit relay) 52 is connected in parallel with the resistor 51.

In FIG. 8, a part having the same function as a part in FIG. 7 is allotted the same number.

In FIG. 8, a function such that current is limited by the resistor 51 when initially charging the capacitor 5, and an inrush current is prevented by the switch 52 being turned on after the charging is completed, thereby short-circuiting the two ends of the resistor 51, is included in addition to the function held by the related art technology of FIG. 7.

SUMMARY

In recent years, in order to combat environmental problems, a further increase in efficiency has also been required of a power converting device configuring a power supply device or the like. Reducing conduction loss due to forward voltage drop in a semiconductor device is proposed as one means of achieving an increase in efficiency of a power converting device.

For example, when a MOSFET is used as the switching device 3 in FIG. 6 to FIG. 8, the MOSFET has resistance characteristics when conductive, because of which conduction loss can be brought limitlessly close to zero, at least in theory, by a number of parallel connections being increased.

Meanwhile, a forward voltage drop of a diode is of a fixed magnitude that does not depend on current. Because of this, there is a limit to a reduction of conduction loss even when a number of the diode 4 of FIG. 6 to FIG. 8 connected in parallel is increased. In particular, although a fast recovery diode has an advantage in that reverse recovery loss is small, a forward voltage drop is large in comparison with that of a so-called rectifying diode, which has an object of rectifying a commercial frequency.

Consequently, when combating by replacing a fast recovery diode with a rectifying diode, connecting rectifying diodes in parallel, or the like, the rectifying diode causes an extremely large reverse recovery loss, because of which the object of increasing efficiency cannot be achieved.

Also, when using a diode formed of a WBG material, such as a Schottky barrier diode, this kind of diode is expensive in comparison with a diode formed of a silicon material, and causes an increase in device cost.

Furthermore, the third related art technology shown in FIG. 8 has a problem in that the further the device capacity increases, the further the sizes of the current limiting resistor 51 and short-circuiting switch 52 increase.

Also, when a short-circuit fault occurs in the switching device 3 or capacitor 5, a current $I_{in}$ continues to flow into the resistor 51 without the initial charging being completed. As the current $I_{in}$ is of a level such that general overcurrent protection means (not shown) does not operate, there is a danger of the resistor 51 presently burning out and igniting. In order to prevent these accidents, a countermeasure such as connecting another switch in series with the resistor 51 or providing a temperature fuse is necessary, and there is a problem in that this leads to a further increase in device size and cost.

Therefore, the disclosure provides a power converting device such that semiconductor device conduction loss and reverse recovery loss are reduced to an utmost, and overall efficiency is increased, and, moreover, increase in device size and cost is prevented.

In order to achieve the benefits mentioned in the above paragraph, a first aspect of the disclosure is a power converting device including a closed circuit formed by a first semiconductor switching device, fast recovery diode, and capacitor being connected in series, and a inductor of which one end is connected to a connection point of the first semiconductor switching device and fast recovery diode, the power converting device configuring a chopper circuit with the first semiconductor switching device, fast recovery diode, and inductor, converting an input voltage of the chopper circuit into a voltage of a differing magnitude using a switching operation of the first semiconductor switching device, and supplying the converted voltage to a load, wherein current flowing through the inductor when the first semiconductor switching device is turned on flows through the first semiconductor switching device and current flowing through the inductor when the first semiconductor switching device is turned off flows through the fast recovery diode, a series circuit of a rectifying diode with a greater reverse recovery loss and smaller forward voltage drop than the fast recovery diode and a second semiconductor switching device with a lower breakdown voltage and smaller forward voltage drop than the first semiconductor switching device is connected in parallel with the fast recovery diode, the second semiconductor switching device is turned on when the first semiconductor switching device is turned off, and the second semiconductor switching device is turned off at a timing before the first semiconductor switching device shifts from an off-state to an on-state.

A second aspect of the disclosure configures a so-called step-up chopper circuit wherein the power converting device according to the first aspect is such that a power supply unit is connected to both ends of a series circuit of the inductor and first semiconductor switching device, and voltage generated in the capacitor connected to both ends of a series circuit of the first semiconductor switching device and fast recovery diode is supplied to the load connected in parallel with the capacitor by a switching operation of the first semiconductor switching device.

A third aspect of the disclosure configures a so-called step-down chopper circuit wherein the power converting device according to the first aspect is such that the capacitor is connected to both ends of a series circuit of the first semiconductor switching device and fast recovery diode and a power supply unit is connected in parallel with the capacitor, and voltage is supplied to the load connected to both ends of a series circuit of the capacitor, first semiconductor switching device, and inductor by a switching operation of the first semiconductor switching device.

A fourth aspect of the disclosure is the power converting device according to the first aspect, wherein an alternating current power supply configuring a power supply unit and a bridge rectifier circuit are connected to an input side of the chopper circuit, or an alternating current power supply configuring a power supply unit is connected to input sides of a multiple of the chopper circuit, and the chopper circuit is caused to operate as an alternating current-direct current power converting device by being caused to respond to both positive and negative polarities of power supply voltage.

A fifth aspect of the disclosure is the power converting device according to the first aspect, wherein the first semiconductor switching device is turned off and the second semiconductor switching device is turned on when an input current of the chopper circuit exceeds a predetermined value and becomes an overcurrent.

A sixth aspect of the disclosure is the power converting device according to the first aspect, wherein an alternating current power supply configuring a power supply unit and a bridge rectifier circuit are connected to an input side of the chopper circuit, and thyristors, or semiconductor devices that have a predetermined breakdown voltage in both forward and reverse directions and can control forward direction current, are used as at least two rectifying devices in the bridge rectifier circuit.

A seventh aspect of the disclosure is the power converting device according to any one of the first through sixth aspects, wherein the fast recovery diode is configured of a wide bandgap semiconductor.

According to the disclosure, a series circuit of a rectifying diode, which has small conduction loss, and a second semiconductor switching device is connected in parallel with a fast recovery diode, which has small reverse recovery loss, and forward current before reverse recovery occurs is blocked by the second semiconductor switching device. Because of this, reverse recovery of the rectifying diode is avoided, and a low forward voltage drop characteristic of the rectifying diode is utilized, whereby an increase in efficiency of a power converting device can be realized.

DESCRIPTION OF EMBODIMENTS

Hereafter, based on the drawings, embodiments of the disclosure will be described.

Figure 1:
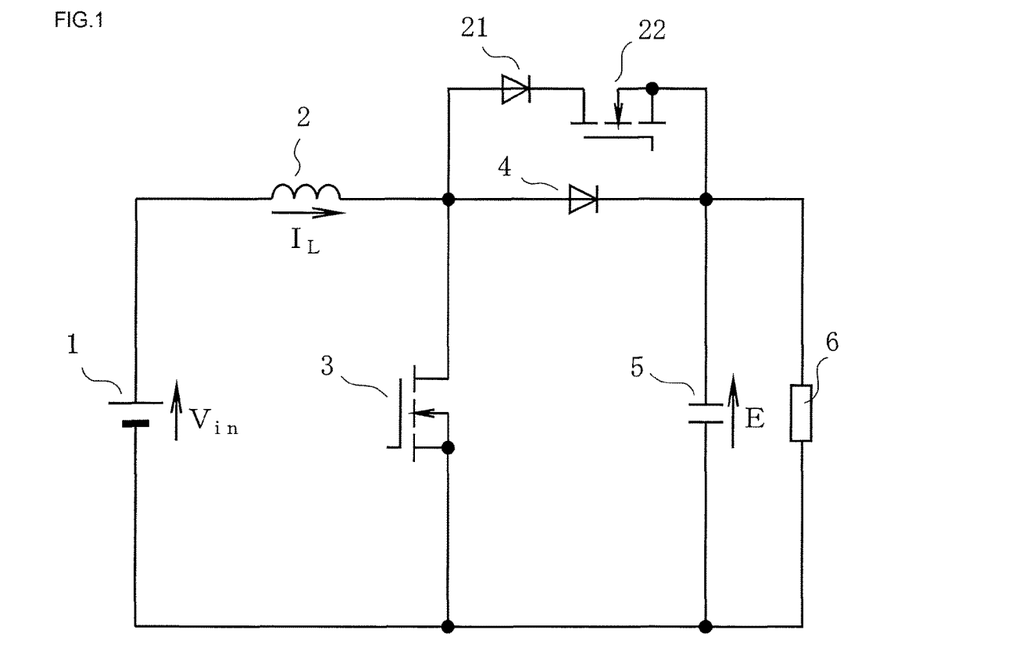
FIG. 1 is a circuit diagram showing a first embodiment of the disclosure.

FIG. 1 is a circuit diagram showing a first embodiment of the disclosure. Although one portion of the circuit of FIG. 1 is the same as FIG. 6, an overall configuration of the circuit of FIG. 1 will be described hereafter in order to clarify the embodiment.

In FIG. 1, a inductor 2, diode 4, and capacitor 5 are connected in series to both ends of a direct current power supply 1, and a load 6 is connected in parallel with the capacitor 5. Also, a first semiconductor switching device 3 is connected between an anode of the diode 4 and a negative electrode of the direct current power supply 1. Furthermore, a series circuit of a rectifying diode 21 and second semiconductor switching device 22 is connected in parallel with the diode 4.

Herein, MOSFETs are used as the semiconductor switching devices (hereafter referred to simply as switching devices) 3 and 22. Also, the diode 4 is, for example, a fast recovery diode.

A basic operation of this circuit is the same as that of the previously described circuit of FIG. 6. That is, a current $I_L$ can be controlled to an arbitrary value by a time ratio of on and off-states of the switching device 3 being controlled, and a voltage E can be controlled to an arbitrary value higher than an input voltage $V_{in}$ by an input power being controlled.

Herein, in a state wherein voltage is applied in a forward direction to the switching device 22, voltage is also applied in a forward direction to the diode 4. Consequently, as no voltage exceeding a forward voltage drop of the diode 4 is constantly applied in a forward direction to the switching device 22, a device with an extremely low breakdown voltage can be used as the switching device 22. Also, as the switching device 22 is in a conductive state in a reverse direction owing to a parasitic diode thereof (not shown), hardly any reverse voltage is applied, and blocking of reverse current is the responsibility of the rectifying diode 21.

As will be described hereafter, a certain amount of surge voltage caused by wiring inductance is applied to the switching device 22 when the switching device 22 is turned off. Because of this, for example, the switching device 22 with a breakdown voltage in the region of several tens of volts is selected for a circuit wherein the voltage E of the capacitor 5 is several hundred volts. As an on-state resistance of a MOSFET is approximately proportional to the square of breakdown voltage, the on-state resistance of the switching device 22 is one-hundredth or less of the on-state resistance of the switching device 3, provided that the devices are of the same external form.

In this way, the switching device 22 has an extremely low on-state resistance in comparison with a device having a breakdown voltage that can withstand a circuit voltage of several hundred volts, because of which an increase in forward voltage drop due to being connected in series with the rectifying diode 21 can be practically ignored.

On the switching device 22 being turned on when the switching device 3 is turned off, the series circuit of the rectifying diode 21 and switching device 22, and the diode 4, become conductive. Herein, the forward voltage drop of the rectifying diode 21 is smaller than that of the diode 4, and the on-state resistance of the switching device 22 can be practically ignored as heretofore described, because of which a majority of the current flows through the series circuit of the rectifying diode 21 and switching device 22, and the forward voltage drop of the rectifying diode 21 is predominant.

Also, on the switching device 22 being turned off at a timing immediately before the switching device 3 is turned on again, the current $I_L$ is commutated into the diode 4. At this time, a slight surge voltage is generated by wiring inductance (not shown) related art in a circular path from the rectifying diode 21 through the switching device 22 to the diode 4, but the surge voltage can be sufficiently restricted by the speed at which the switching device 22 is turned off being reduced.

Unlike a normal switching power supply circuit, there is no voltage source connected in parallel with the switching device 22 at this time, only the forward voltage drop of the diode 4 slightly corresponding thereto, because of which only a switching loss of an extent that can be ignored occurs, even when the speed at which the switching device 22 is turned off is reduced.

On the switching device 3 being turned on, a reverse voltage of a magnitude practically equivalent to the voltage E is applied to the diodes 4 and 21, and reverse recovery occurs in the diode 4. By a fast recovery diode being used as the diode 4 as previously described, reverse recovery loss is small, and in particular, reverse recovery loss barely occurs when a Schottky barrier diode formed of a WBG material is used.

Meanwhile, the rectifying diode 21 is such that reverse voltage is applied from a state wherein there is no forward current, no reverse recovery phenomenon occurs, and only a slight loss accompanying a charging of parasitic capacitance (not shown) of the rectifying diode 21 occurs. The diode 4 is conductive for a very short period from the switching device 22 being turned off until the switching device 3 is turned on, because of which an element with a small current capacity can be used as the diode 4 within a range allowed by pulse current resistance.

A timing at which the switching device 22 is turned on again may be any time after the turning on of the switching device 3 is finished, with there being no need to wait for the switching device 3 to be turned off.

Also, a diode is such that a voltage higher than a normal forward voltage drop, called a transient on-state voltage, may be generated for a short time when a pulse current flows. The circuit of FIG. 1 is such that when the switching device 22 is in an off-state when the switching device 3 is turned off, a pulse current flows into the diode 4, and a transient on-state voltage is generated. Although this transienton-state voltage is a cause of an increase in loss or an increase in voltage applied to the switching device 3, the generation of transient on-state voltage in the diode 4 can also be avoided by the switching device 22 being turned on in advance, thereby forming a current path of the series circuit of the rectifying diode 21 and switching device 22.

Figure 2:
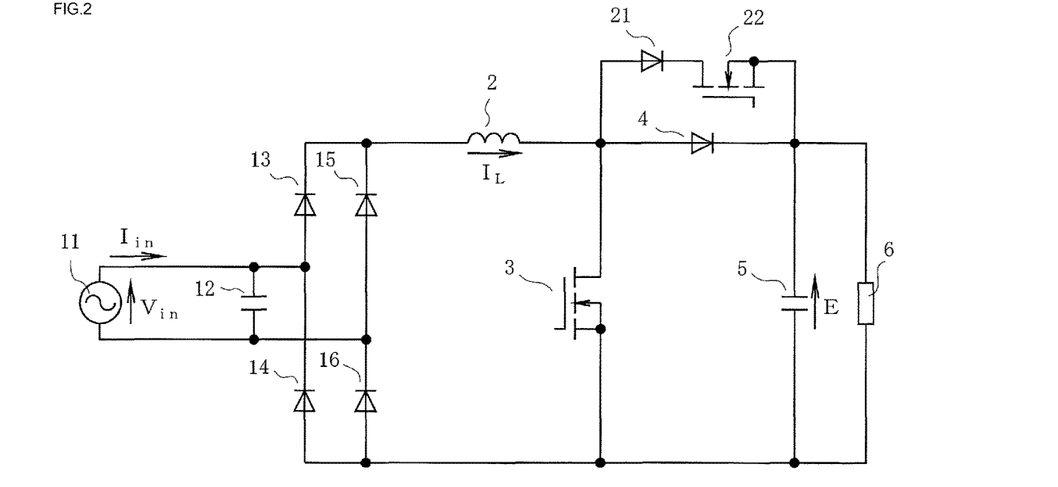
FIG. 2 is a circuit diagram showing a second embodiment of the disclosure.

Next, FIG. 2 is a circuit diagram showing a second embodiment of the disclosure.

The second embodiment is an example wherein a rectifying power supply is used in place of the direct current power supply 1 of FIG. 1, and the rectifying power supply is configured of a bridge rectifier circuit formed of an alternating current power supply 11 and rectifying diodes 13 to 16, in the same way as in FIG. 7. 12 is a filtering capacitor.

This circuit is well-known as a PFC (power factor correction) circuit, and by utilizing the characteristic of the current $I_L$ being arbitrarily controllable, as previously described, the voltage E can be kept at a desired value while arranging that the input current $I_{in}$ is a sine wave in phase with the input voltage $V_{in}$.

As operations of the diodes 4 and 21 and switching device 22 are the same as in the first embodiment, a description thereof will be omitted.

The circuit of FIG. 2 is such that when recovering from a momentary voltage drop of the alternating current power supply 11, or when there is an input overcurrent due to another cause, almost all of the current flows into the series circuit of the rectifying diode 21 and switching device 22 owing to a difference in forward voltage drop from that of the diode 4, provided that the switching device 3 is turned off and the switching device 22 is kept in an on-state. That is, a role the same as that of the bypass diode 17 in FIG. 7 and FIG. 8, which are related art technology, can be fulfilled by the rectifying diode 21.

In this case, additional parts in FIG. 2 with respect to, for example, FIG. 7 are only the switching device (MOSFET) 22, which is small owing to having low breakdown voltage, and a drive circuit thereof, meaning that in addition to the cost of the additional parts being negligible, the current capacity of the diode 4, which is an expensive fast recovery diode or the like, can be reduced. Because of this, according to the circuit of FIG. 2, not only an increase in efficiency compared to the circuit of FIG. 7 can be achieved, but also cost can be reduced.

As another method of reducing loss accompanying diode forward voltage drop, there is a method whereby the diode is replaced by a MOSFET, as shown in, for example, JP-A-2014-79144. A MOSFET has a characteristic of conducting in a reverse direction using a parasitic diode, but in addition to this, the MOSFET itself also conducts not only in a forward direction but also in a reverse direction when voltage is applied to a gate. As a MOSFET also has resistance characteristics, voltage can be reduced even further than the forward voltage drop of a parasitic diode, and the MOSFET is generally well-known technology for synchronous rectification.

However, when the diode 4 is replaced by a MOSFET or a MOSFET is connected in parallel with the diode 4 in, for example, the circuit of FIG. 1 or FIG. 2, the parasitic diode of the MOSFET causes reverse recovery. When the voltage E of the capacitor 5 is several hundred volts or more, the parasitic diode of a MOSFET with a high breakdown voltage compatible with the voltage E generally has extremely large reverse recovery loss, and the MOSFET itself is sometimes damaged by the loss, because of which the MOSFET, in principle, is not applicable to a circuit in which reverse recovery occurs. In response to this, reverse recovery can be avoided by the rectifying diode 21 being replaced by a MOSFET with a high breakdown voltage, and forward current being blocked in the switching device 22. However, a MOSFET with a low on-state resistance generally has a large drain-to-source parasitic capacitance. Consequently, a charge loss higher than that of the rectifying diode 21 in FIG. 1 or FIG. 2 occurs, which cancels out the advantage of reducing conduction loss in an device that carries out high frequency switching.

For the heretofore described kinds of reason, the diode 4 in the circuit of FIG. 1 or FIG. 2 being replaced by a MOSFET, or the like, is not appropriate.

Figure 3:
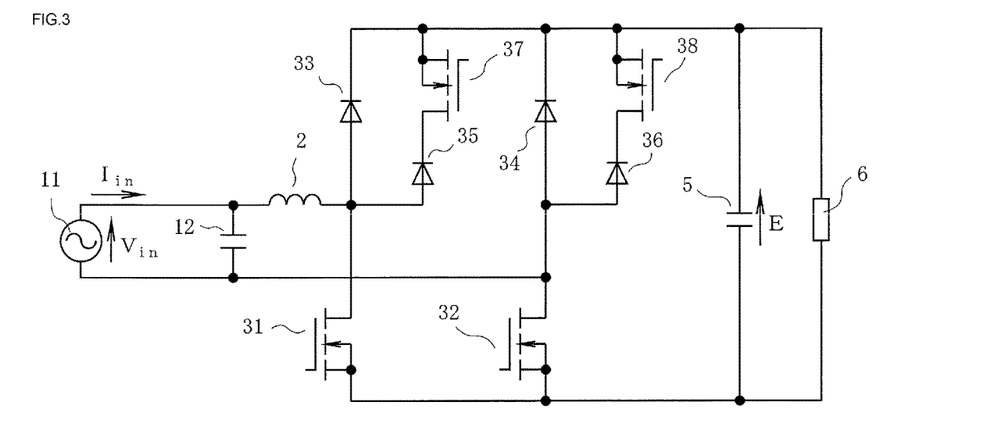
FIG. 3 is a circuit diagram showing a third embodiment of the disclosure.

Next, FIG. 3 is a circuit diagram showing a third embodiment of the disclosure. This embodiment is an example wherein the disclosure is applied to a so-called bridgeless PFC circuit that does not need a bridge rectifier circuit.

In FIG. 3, the capacitor 12 is connected to both ends of the direct current power supply 11, and one end of the capacitor 12 is connected via the inductor 2 to a series connection point of a diode (fast recovery diode) 33 and switching device 31. A series circuit of a diode (fast recovery diode) 34 and switching device 32, the capacitor 5, and the load 6 are connected in parallel to the series circuit of the diode 33 and switching device 31.

Herein, the switching devices 31 and 32 correspond to a first semiconductor switching device in the claims.

Also, a series circuit of a switching device 37 and rectifying diode 35 is connected in parallel with the diode 33, and a series circuit of a switching device 38 and rectifying diode 36 is connected in parallel with the diode 34. Herein, the switching devices 37 and 38 correspond to a second semiconductor switching device in the claims.

Furthermore, the other end of the capacitor 12 is connected to a series connection point of the diode 34 and switching device 32.

In this embodiment too, MOSFETs are used as the switching devices 31, 32, 37, and 38.

In FIG. 2, for example, a current path when the switching device 3 is turned on when the current $I_{in}$ has positive polarity is from the alternating current power supply 11 through the rectifying diode 13, inductor 2, switching device 3, and rectifying diode 16 to the alternating current power supply 11, and current passes through three semiconductor devices.

As opposed to this, in the third embodiment of FIG. 3, a current path when, in the same way, the switching device 3 is turned on when the current $I_{in}$ has positive polarity is from the alternating current power supply 11 through the inductor 2, switching device 31, and parasitic diode (not shown) of the switching device 32 to the alternating current power supply 11, and current passes through only two semiconductor devices, because of which conduction loss can be reduced in comparison with FIG. 2.

Also, when the switching device 31 in FIG. 3 is turned off, current flows first along a path from the alternating current power supply 11 through the inductor 2, rectifying diode 35, switching device 37, capacitor 5, and parasitic diode of the switching device 32 to the alternating current power supply 11, and when the switching device 37 is turned off, the current is commutated to the diode 33, after which the switching device 31 is turned on again. This operation is the same as in the first embodiment of FIG. 1.

Furthermore, when the current $I_{in}$ has negative polarity, a circuit formed of the switching device 32, rectifying diode 36, switching device 38, and diode 34 carries out the same operation.

Figure 4:
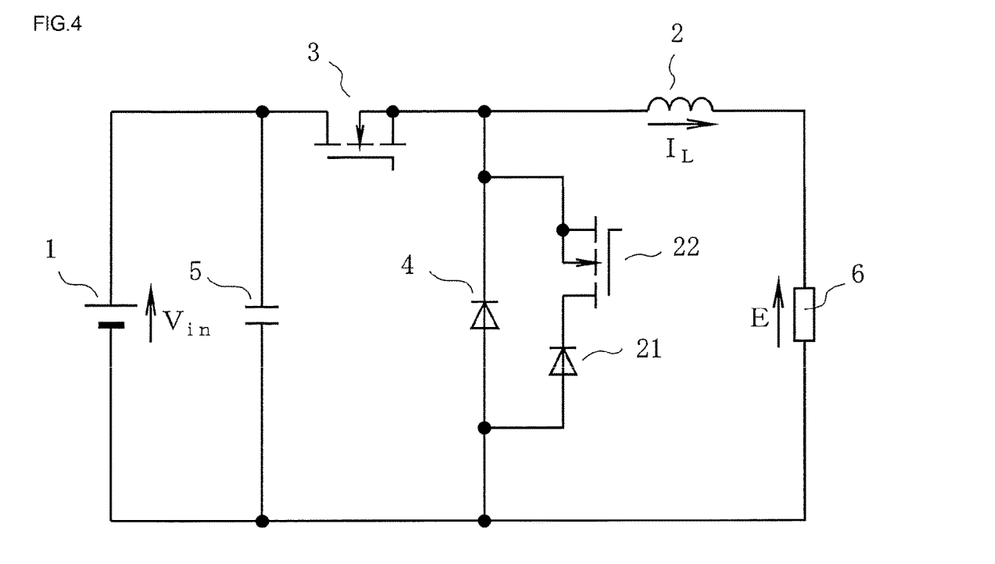
FIG. 4 is a circuit diagram showing a fourth embodiment of the disclosure.

Next, FIG. 4 is a circuit diagram showing a fourth embodiment of the disclosure, and is an example wherein the disclosure is applied to a step-down chopper circuit that converts the input voltage $V_{in}$ of the direct current power supply 1 to the voltage E lower than the input voltage $V_{in}$.

In FIG. 4, the capacitor 5 is connected to both ends of the direct current power supply 1. A series circuit of the switching device 3 and diode 4 is connected to both ends of the capacitor 5, and the series circuit of the rectifying diode 21 and switching device 22 is connected to both ends of the diode 4. Furthermore, a series circuit of the inductor 2 and load 6 is connected to both ends of the diode 4.

Herein, the diode 4 is a fast recovery diode, such as a Schottky barrier diode using a WBG material, in the same way as previously described, and MOSFETs are used as the switching devices 3 and 22.

In this circuit, current flows into the load 6 owing to the switching device 3 being turned on, together with which energy is accumulated in the inductor 2. Further, on the switching device 3 being turned off and the switching device 22 being turned on, the current $I_L$ flows into the series circuit of the rectifying diode 21 and switching device 22, and on the switching device 22 being turned off, the current $I_L$ is commutated to the diode 4. Subsequently, on the switching device 3 being turned on again, reverse recovery occurs in the diode 4.

In this circuit, the functions of the diodes 4 and 21 and the function of the switching device 22 after the switching device 3 is turned off are the same as in the circuits of FIG. 1 and FIG. 2, because of which a description thereof will be omitted.

Figure 5:
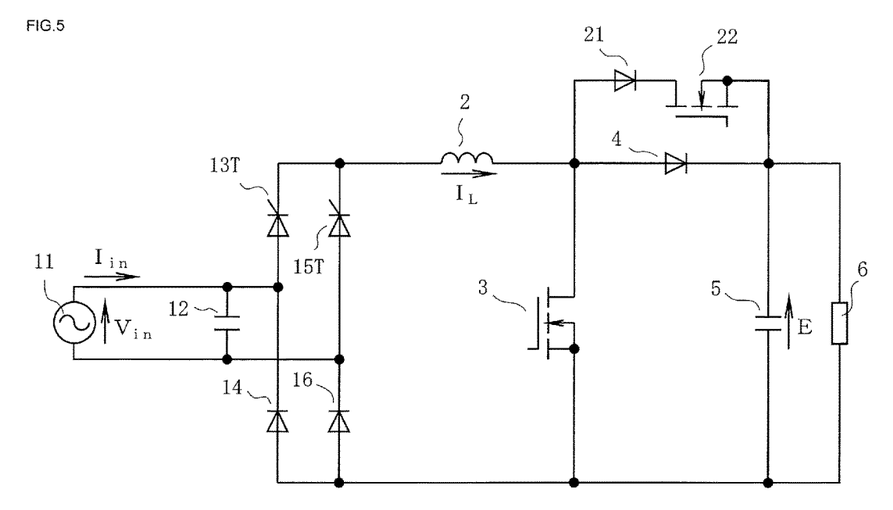
FIG. 5 is a circuit diagram showing a fifth embodiment of the disclosure.

Next, FIG. 5 is a circuit diagram showing a fifth embodiment of the disclosure, and corresponds to a modification example of the second embodiment shown in FIG. 2.

That is, in the fifth embodiment of FIG. 5, the diodes 13 and 15 in the bridge rectifier circuit of FIG. 2 are replaced by thyristors 13T and 15T respectively. Other configurations are the same as in FIG. 2. Semiconductor devices that have a predetermined breakdown voltage in both forward and reverse directions, and can control forward direction current, may be used in place of the thyristors 13T and 15T.

As previously described, a third related art technology shown in FIG. 8 is such that there is concern that a resistor 51 and switch 52 will increase in size due to an increase in device capacity, that the resistor 51 will burn out when a short-circuit fault occurs in the switching device 3 or the like, and so on, and these concerns are caused by a configuration of an initial charging circuit (the resistor 51 and switch 52) of the capacitor 5. The fifth embodiment shown in FIG. 5 is for resolving the heretofore described problems.

In the fifth embodiment, when initially charging the capacitor 5, phase control is carried out so that the thyristor 13T or 15T is turned on in a period of an electrical angle of 90° to 180°, or 270° to 360°, in which a momentary value of the input voltage $V_{in}$ drops, and at a timing at which the input voltage $V_{in}$ is practically equivalent to the voltage E of the capacitor 5. By so doing, an inflow of inrush current can be prevented without using the resistor 51 or switch 52 of FIG. 8, and a reduction in device size and improvement of safety can be achieved. In FIG. 5, the inductor 2 connected in series to output sides (cathodes) of the thyristors 13T and 15T fulfils a function of restricting overcurrent when the input voltage $V_{in}$ increases suddenly while the thyristors 13T and 15T are conductive. However, there is a possibility of a current exceeding a surge current resistance of the diode 4 flowing in. Therefore, by the MOSFET 22 being turned on in advance during the initial charging, a majority of the inrush current flows through the rectifying diode 21 and MOSFET 22. The rectifying diode 21 and MOSFET 22 have a smaller forward voltage drop and greater surge current resistance than those of the diode 4, because of which damage due to surge current can be avoided.

In the first to fifth embodiments, as heretofore described, series circuits of the rectifying diodes 21, 35, and 36, which have small conduction loss, and second semiconductor switching devices 22, 37, and 38 are connected in parallel with the diodes (fast recovery diodes) 4, 33, and 34, which have small reverse recovery loss, and forward current before reverse recovery occurs is blocked by the second semiconductor switching devices 22, 37, and 38. Because of this, reverse recovery of the rectifying diodes 21, 35, and 36 can be avoided, and the low forward voltage drop characteristic of the rectifying diodes 21, 35, and 36 can be utilized, whereby a highly efficient power converting device wherein reverse recovery loss and conduction loss are reduced can be realized.

Embodiments of the disclosure can be utilized in various kinds of power converting devices, such as a so-called step-up chopper circuit or step-down chopper circuit, that supply direct current voltage to a load.

In this disclosure, wherever an element or component is discussed as performing or being caused to perform an operation or functionality, it shall be understood that such element or component may be configured to perform such operations or functionalities. For example, the switching elements 3, 22, 31, 32, 37, 38, may be configured to perform the on/off switching operations discussed in this disclosure, and the thyristors 13T and 15T may be configured to perform the associated operations discussed in this disclosure. Moreover, the power converting device of the aforementioned embodiments may be configured to cause or carry out any of the various operations or functionalities mentioned for the aforementioned embodiments. Elements or components may be configured to perform operations or functionalities by any suitable structural arrangements, including control structures external to the element or component.

Inclusion in this disclosure of any characterization of any product or method of the related art does not imply or admit that such characterization was known in the prior art or that such characterization would have been appreciated by one of ordinary skill in the art at the time a claimed invention was made, even if the product or method itself was known in the prior art at the time. For example, if a related art document discussed in this disclosure constitutes prior art, the inclusion of any characterization of the related art document does not imply or admit that such characterization of the related art document was known in the prior art or would have been appreciated by one of ordinary skill in the art at the time a claimed invention was made, especially if the characterization is not disclosed in the related art document itself.

Although a few embodiments have been shown and described, it would be appreciated by those skilled in the art that changes may be made in these embodiments without departing from the principles and spirit of the invention, the scope of which is defined in the claims and their equivalents.

Reference signs and numerals are as follows:
1: Direct current power supply
2: Inductor
3, 22, 31, 32, 37, 38: Semiconductor switching device (MOSFET)
4, 33, 34: Diode (fast recovery diode)
5, 12: Capacitor
6: Load
11: Alternating current power supply
13 to 16: Rectifying diode
13T, 15T: Thyristor
21, 35, 36: Rectifying diode

What is claimed is:

1. A power converting device, comprising:
a chopper circuit to convert an input voltage into a converted voltage of a differing magnitude using a switching operation and to supply the converted voltage to a load, the chopper circuit comprising
a first semiconductor switching device configured to perform the switching operation,
a fast recovery diode, and
an inductor of which one end is connected to a connection point connecting between the first semiconductor switching device and the fast recovery diode,
wherein current flowing through the inductor flows through the first semiconductor switching device when the first semiconductor switching device is turned on, and current flowing through the inductor flows through the fast recovery diode when the first semiconductor switching device is turned off;
a capacitor, connected in series to the first semiconductor switching device and to the fast recovery diode so as to form a closed circuit comprising the capacitor, the first semiconductor switching device and the fast recovery diode; and
a series circuit connected in parallel with the fast recovery diode, the series circuit comprising
a rectifying diode with a greater reverse recovery loss than a reverse recovery loss of the fast recovery diode and a smaller forward voltage drop than a forward voltage drop of the fast recovery diode, and
a second semiconductor switching device connected in series with the rectifying diode, having a lower breakdown voltage than a breakdown voltage of the first semiconductor device and a smaller forward voltage drop than a forward voltage drop of the first semiconductor switching device, configured to turn on when the first semiconductor switching device is turned off, and configured to turn off at a timing before the first semiconductor switching device shifts from an off-state to an on-state.

2. The power converting device according to claim 1, configured to connect to the load by connecting the load in parallel with the capacitor.

3. The power converting device according to claim 2, wherein
a power supply is connected to both ends of a series circuit of the inductor and first semiconductor switching device,
the capacitor is connected to both ends of a series circuit of the first semiconductor switching device and the fast recovery diode,
the load is connected in parallel with the capacitor, and
voltage generated in the capacitor is supplied to the load by the switching operation of the first semiconductor switching device.

4. The power converting device according to claim 1, configured to connect to a power supply, which supplies the input voltage, by connecting the power supply in parallel with the capacitor.

5. The power converting device according to claim 4, wherein
the capacitor is connected to both ends of a series circuit of the first semiconductor switching device and the fast recovery diode,
the power supply is connected in parallel with the capacitor,
the load is connected to both ends of a series circuit of the capacitor, first semiconductor switching device, and inductor, and
voltage is supplied to the load by the switching operation of the first semiconductor switching device.

6. The power converting device according to claim 1, wherein
an alternating current power supply and a bridge rectifier circuit are connected to an input side of the chopper circuit, and
the chopper circuit operates as an alternating current-direct current power converter by being caused to respond to both positive and negative polarities of power supply voltage.

7. The power converting device according to claim 1, wherein
the chopper circuit and the series circuit are disposed in plural as a plurality of chopper circuits respectively parallel-connected to a plurality of series circuits,
an alternating current power supply is connected to input sides of the plurality of chopper circuits, and
the chopper circuit operates as an alternating current-direct current power converter by being caused to respond to both positive and negative polarities of power supply voltage.

8. The power converting device according to claim 1, configured to turn off the first semiconductor switching device and turn on the second semiconductor switching device in response to an input current of the chopper circuit exceeding a predetermined value, which indicates an overcurrent.

9. The power converting device according to claim 1, wherein
an alternating current power supply and a bridge rectifier circuit are connected to an input side of the chopper circuit, and
at least two rectifying devices in the bridge rectifier circuit are each a thyristor, or a semiconductor device that has a predetermined breakdown voltage in both forward and reverse directions and can control forward direction current.

10. The power converting device according to claim 1, wherein the fast recovery diode is configured of a wide bandgap semiconductor.

11. The power converting device according to claim 2, wherein
the fast recovery diode is configured of a wide bandgap semiconductor.

12. The power converting device according to claim 3, wherein
the fast recovery diode is configured of a wide bandgap semiconductor.

13. The power converting device according to claim 4, wherein
the fast recovery diode is configured of a wide bandgap semiconductor.

14. The power converting device according to claim 5, wherein
the fast recovery diode is configured of a wide bandgap semiconductor.

15. The power converting device according to claim 6, wherein
the fast recovery diode is configured of a wide bandgap semiconductor.

16. The power converting device according to claim 7, wherein
the fast recovery diode is configured of a wide bandgap semiconductor.

17. The power converting device according to claim 8, wherein
the fast recovery diode is configured of a wide bandgap semiconductor.

18. The power converting device according to claim 9, wherein
the fast recovery diode is configured of a wide bandgap semiconductor.

* * * * *

UNITED STATES PATENT AND TRADEMARK OFFICE
CERTIFICATE OF CORRECTION

PATENT NO.         : 9,979,286 B2
APPLICATION NO.    : 15/641929
DATED              : May 22, 2018
INVENTOR(S)        : Ryuji Yamada

It is certified that error appears in the above-identified patent and that said Letters Patent is hereby corrected as shown below:

On the Title Page

Item (71) (Applicant):
Delete "FUJI ELECTRIC CO.,LTD.," and insert -- FUJI ELECTRIC CO., LTD., --, therefore.

Item [*] (Notice), Line 14:
After "0 days." delete "days.".

Signed and Sealed this
Seventh Day of August, 2018

Andrei Iancu
*Director of the United States Patent and Trademark Office*